United States Patent
Shibuya (10) Patent No.: US 11,683,568 B2
(45) Date of Patent: Jun. 20, 2023

(54) IMAGE CAPTURING SYSTEM, IMAGE PROCESSING PROGRAM, AND IMAGE PROCESSING METHOD

(71) Applicant: Hitachi Kokusai Electric Inc., Tokyo (JP)

(72) Inventor: Takuhiro Shibuya, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 17/799,233

(22) PCT Filed: Feb. 21, 2020

(86) PCT No.: PCT/JP2020/007161
§ 371 (c)(1),
(2) Date: Aug. 11, 2022

(87) PCT Pub. No.: WO2021/166236
PCT Pub. Date: Aug. 26, 2021

(65) Prior Publication Data
US 2023/0073565 A1    Mar. 9, 2023

(51) Int. Cl.
*H04N 23/16* (2023.01)
*H04N 23/76* (2023.01)
(Continued)

(52) U.S. Cl.
CPC ............ *H04N 23/16* (2023.01); *H04N 9/646* (2013.01); *H04N 23/741* (2023.01); *H04N 23/76* (2023.01)

(58) Field of Classification Search
None
See application file for complete search history.

(56) References Cited

U.S. PATENT DOCUMENTS

| | | | |
|---|---|---|---|
| 2010/0157149 A1* | 6/2010 | Nobori | H04N 23/81 |
| | | | 348/E7.003 |
| 2010/0271515 A1* | 10/2010 | Imagawa | H04N 25/534 |
| | | | 348/E9.002 |
| 2019/0280037 A1* | 9/2019 | Kanto | H04N 25/63 |

FOREIGN PATENT DOCUMENTS

| | | |
|---|---|---|
| JP | H01-204579 A | 8/1989 |
| JP | H07-250332 A | 9/1995 |

(Continued)

OTHER PUBLICATIONS

Patent Cooperation Treaty, International Search Report, Application No. PCT/JP2020/007161, dated Apr. 6, 2020, in 4 pages.

*Primary Examiner* — Quan Pham
(74) *Attorney, Agent, or Firm* — Procopio, Cory, Hargreaves & Savitch LLP (57) ABSTRACT

The present invention provides a technique of reducing colored afterimages. To solve this problem, an image capturing system includes the following structure: A color separation optical system disperses subject light into a plurality of wavelength ranges, and forms images of a plurality of color components. A plurality of image capturing elements capture the respective images of the plurality of color components, and generate the respective color components of a video signal. A color-specific exposure setting unit sets respective exposure periods for the plurality of color components. An exposure control unit performs exposure control α of approximately simultaneously exposure-controlling each of the plurality of image capturing elements to obtain a video signal (hereafter referred to as a reference video signal) in a common period shorter than or equal to a shortest period of the respective exposure periods set for the color components. The exposure control unit also performs exposure control β of exposure-controlling each of the plurality of image capturing elements to obtain a video (Continued)

signal (hereafter referred to as an extended video signal) in a period obtained by subtracting the common period from an exposure period of a corresponding color component.

8 Claims, 5 Drawing Sheets

(51) Int. Cl.
*H04N 23/741* (2023.01)
*H04N 9/64* (2023.01)

(56) References Cited

FOREIGN PATENT DOCUMENTS

| JP | 11-88898 A | 3/1999 |
| JP | 2008-211273 A | 9/2008 |
| JP | 2017-34629 A | 2/2017 |
| WO | 2019/053764 A1 | 3/2019 |

\* cited by examiner

IMAGE CAPTURING SYSTEM, IMAGE PROCESSING PROGRAM, AND IMAGE PROCESSING METHOD

CROSS-REFERENCE TO RELATED APPLICATIONS

This application is US National Stage of International Patent Application PCT/JP2020/007161, filed Feb. 21, 2020 the contents of which are incorporated herein by reference.

TECHNICAL FIELD

The present invention relates to an image capturing system, an image processing program, and an image processing method.

BACKGROUND ART

High dynamic range (HDR)-capable display devices having a contrast ratio closer to that of human vision are receiving attention in recent years with the spread of organic light emitting diode (OLED) technology.

Accordingly, image capturing devices for capturing video to be displayed are strongly required to have a wider dynamic range to support HDR. However, the amount of light that can be photoelectrically converted by an image capturing element is limited, and, in the case where the amount of light is large, a predetermined level or more of light is saturated.

In view of this, there is known a technique of, in a single-plate image capturing device, successively capturing two images with different "exposure periods" and synthesizing the two images to expand the dynamic range (for example, see Patent Document 1).

Multiplate image capturing devices configured to color-separate incident light and receive each color component by a corresponding image capturing element are also known. For such multiplate image capturing devices, there is known a technique of making uniform the amounts of light received by the image capturing elements for the respective color components by an ND filter (light amount reduction filter) to expand the dynamic range (for example, see Patent Document 2).

CITATION LIST

Patent Documents

Patent Document 1: Japanese Patent Application Laid-Open No. H1-204579
Patent Document 2: Japanese Patent Application Laid-Open No. H7-250332

SUMMARY OF THE INVENTION

Problem to be Solved by the Invention

In the multiplate image capturing device in Patent Document 2, light reduction by the ND filter is performed for a specific color component with a large amount of light received to avoid signal saturation, while the amount of light received is maintained for the other color components. This has a certain degree of effect of expanding the dynamic range.

However, the ratio of the amount of light received for each color component varies greatly depending on the light source color temperature which differs, for example, between outdoors and under an electric light. It is therefore difficult to sufficiently expand the dynamic range using the ND filter whose light reduction ratio is fixed.

It is possible to, in the multiplate image capturing device, expand the dynamic range without color saturation of the specific color component by making the exposure periods of the image capturing elements of the respective color components different. With this method, however, the afterimage occurrence degree differs for each color component, so that an afterimage (colored afterimage) with a color shift different from the original subject color occurs.

Such a colored afterimage is a phenomenon different from human visual characteristics, and accordingly is not acceptable in, for example, broadcast cameras that place importance on the video quality (i.e. realistic video).

The present invention therefore has an object of providing a technique of reducing colored afterimages.

Means for Solving the Problems

To solve the problem stated above, one exemplary image capturing system according to the present invention includes a color separation optical system, a plurality of image capturing elements, a color-specific exposure setting unit, and an exposure control unit. The color separation optical system disperses subject light into a plurality of wavelength ranges, and forms images of a plurality of color components. The plurality of image capturing elements capture the respective images of the plurality of color components, and generate the respective color components of a video signal. The color-specific exposure setting unit sets respective exposure periods for the plurality of color components. The exposure control unit performs exposure control $\alpha$ of approximately simultaneously exposure-controlling each of the plurality of image capturing elements to obtain a video signal (hereafter referred to as a reference video signal) in a common period shorter than or equal to a shortest period of the respective exposure periods set for the color components. The exposure control unit also performs exposure control $\beta$ of exposure-controlling each of the plurality of image capturing elements to obtain a video signal (hereafter referred to as an extended video signal) in a period obtained by subtracting the common period from an exposure period of a corresponding color component.

Advantageous Effect of the Invention

According to the present invention, a technique of reducing colored afterimages is provided.

Problems, structures, and effects other than those described above will be shown in the description of embodiments below.

MODES FOR CARRYING OUT THE INVENTION

An embodiment of the present invention will be described in detail below, with reference to the drawings.

First Embodiment

Structure of Image Capturing System 100

Figure 1:
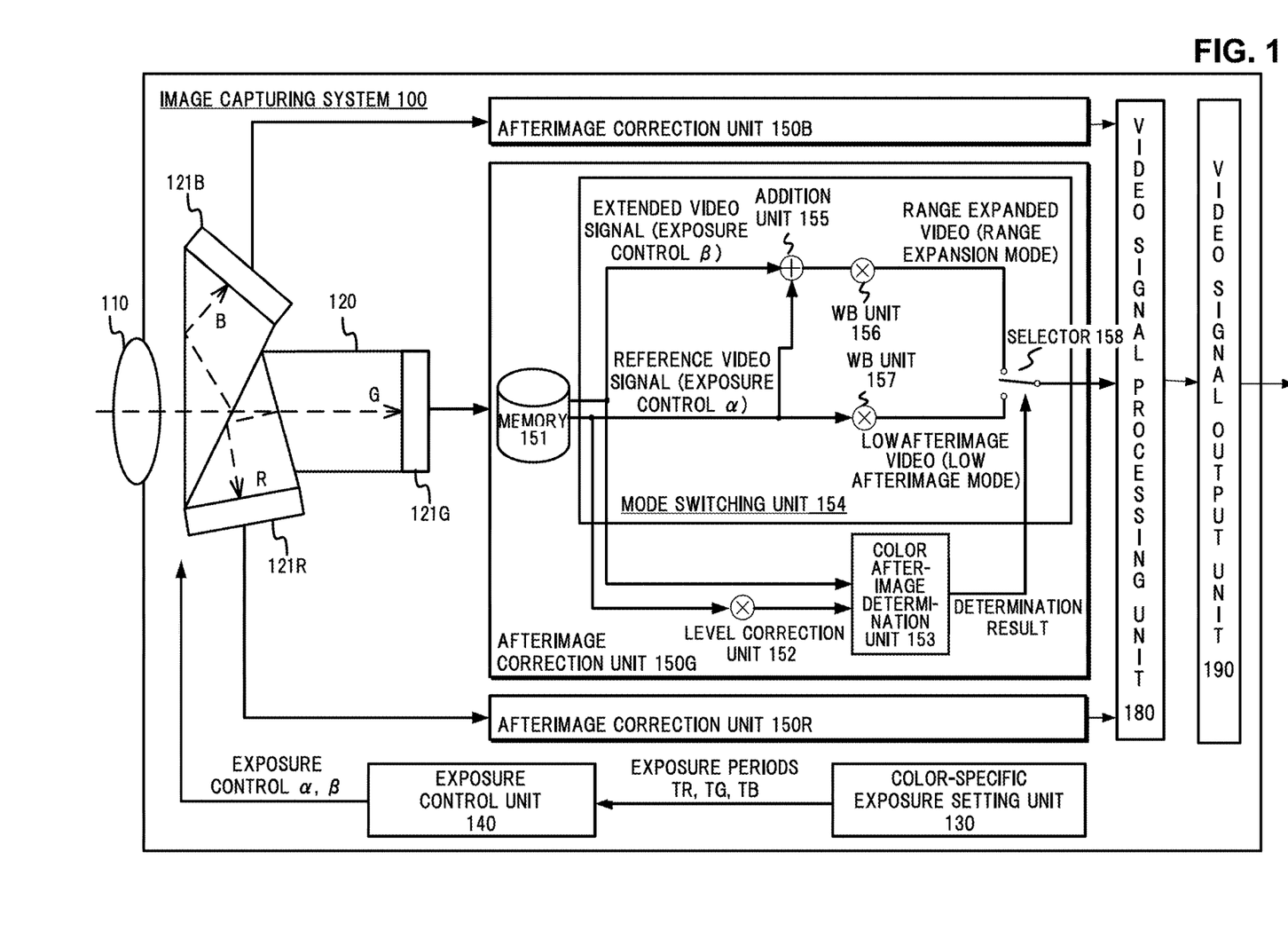
FIG. 1 is a block diagram illustrating the structure of an image capturing system 100 according to a first embodiment.

FIG. 1 is a block diagram illustrating the structure of an image capturing system 100 according to a first embodiment.

In the drawing, the image capturing system 100 includes a photographing optical system 110, a color separation optical system 120, a G color component image capturing element 121G, an R color component image capturing element 121R, a B color component image capturing element 121B, a color-specific exposure setting unit 130, an exposure control unit 140, a G color component afterimage correction unit 150G, an R color component afterimage correction unit 150R, a B color component afterimage correction unit 150B, a video signal processing unit 180, and a video signal output unit 190.

The photographing optical system 110 images subject light that has passed through a diaphragm. The color separation optical system 120 disperses the imaged subject light into the wavelength ranges of the respective color components, and forms images of the respective color components.

The image capturing elements 121R, 121G, and 121B photoelectrically convert the images of the respective color components, to generate the respective color components of a video signal.

The color-specific exposure setting unit 130 sets exposure periods TR, TG, and TB of the R, G, and B color components respectively.

The exposure control unit 140 performs exposure control α and exposure control β successively.

The exposure period in the exposure control α is set to a common period shorter than or equal to the shortest period of the exposure periods TR, TG, and TB. The exposure control unit 140 approximately simultaneously exposure-controls each of the image capturing elements 121R, 121G, and 121B in the common period, to obtain a reference video signal.

The exposure period in the exposure control β is set to a remaining period as a result of subtracting the common period from each of the exposure periods TR, TG, and TB. The exposure control unit 140 exposure-controls each of the image capturing elements 121R, 121G, and 121B in the remaining period, to obtain an extended video signal.

The afterimage correction units 150R, 150G, and 150B each acquire the reference video signal and the extended video signal of the corresponding color component, and perform "colored afterimage determination" and "mode switching". Although only the internal structure of the afterimage correction unit 150G is illustrated in FIG. 1, the afterimage correction units 150R and 150B each have the same internal structure. The afterimage correction units 150R, 150G, and 150B each include a memory 151, a level correction unit 152, a color afterimage determination unit 153, and a mode switching unit 154.

The memory 151 temporarily stores the reference video signal and the extended video signal, and outputs the two signals synchronously in units of pixels.

The level correction unit 152 corrects the level difference caused by the difference in exposure amount between the two signals, based on the ratio between "extended video signal exposure period" and "reference video signal exposure period".

The color afterimage determination unit 153 compares the two signals after the level correction for their difference, to determine a colored afterimage.

The mode switching unit 154 performs a low afterimage mode of generating an output image from the reference video signal, in the case where the colored afterimage determined by the color afterimage determination unit 153 is outside an acceptable range. The mode switching unit 154 performs a range expansion mode of generating an output image from a result of synthesis of the reference video signal and the extended video signal, in the case where the colored afterimage is within the acceptable range. The mode switching unit 154 includes an addition unit 155, a WB unit 156, a WB unit 157, and a selector 158, as illustrated in FIG. 1.

The addition unit 155 synthesizes the reference video signal and the extended video signal in units of pixels, to generate range expanded video.

The WB unit 156 adjusts the RGB gain of the range expanded video in the corresponding one of the afterimage correction units 150R, 150G, and 150B.

On the other hand, the WB unit 157 adjusts (i.e. performs a kind of intensifying treatment on) the RGB gain of the reference video signal so as to make its average signal level uniform with that of the range expanded video, to generate low afterimage video, in the corresponding one of the afterimage correction units 150R, 150G, and 150B.

The selector 158 switches between the range expanded video and the low afterimage video according to the determination result of the color afterimage determination unit 153, and generates an output image. A signal delay unit for, in the case where there is a time lag between the switching timing of the selector 158 and the determination timing of the color afterimage determination unit 153, delaying the earlier timing to resolve the time lag may be provided.

The video signal processing unit 180 performs various signal processing (gamma correction, contour enhancement, noise reduction, white balance adjustment, color conversion, etc.) on the output image.

The video signal output unit 190 converts the output image after the signal processing into a predetermined signal format such as high definition serial digital interface (HD-SDI), and outputs it.

Colored Afterimage Problem

The "colored afterimage problem" will be described below, before the description of the operation sequence according to the first embodiment.

Figure 2:
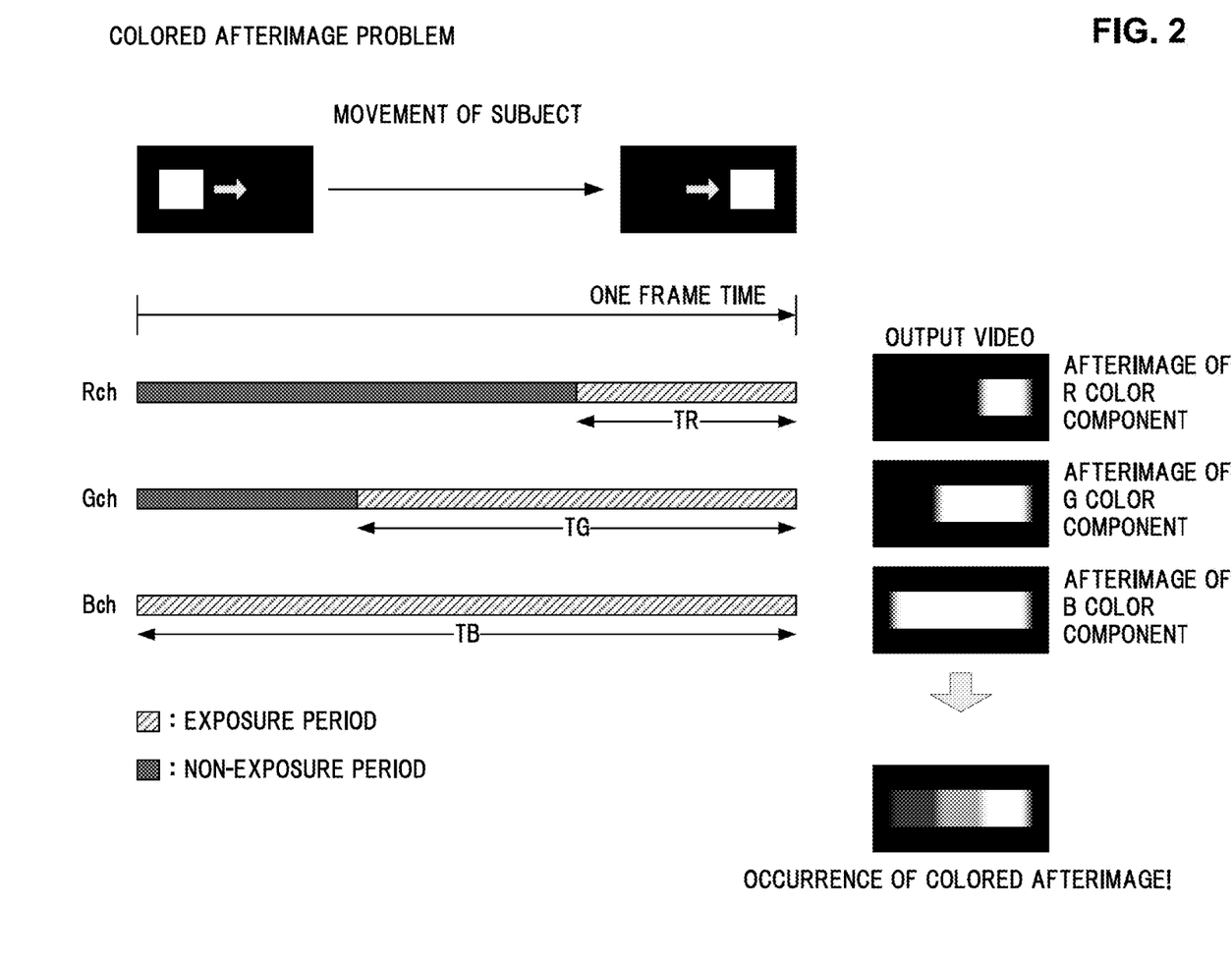
FIG. 2 is a diagram explaining a colored afterimage problem.

FIG. 2 is a diagram explaining the colored afterimage problem.

Take, for example, a photographing environment under an electric light where the light source color temperature is low. Average light of a subject illuminated by the electric light has a wavelength distribution having a peak in the R color gamut. In this case, the amount of light received the R color component image capturing element 121R is larger than the amount of light received by each of the other image capturing elements 121G and 121B in the image capturing system 100. Hence, the R color component of the video signal is color-saturated earlier than the other G and B color components.

In a conventional broadcast camera, a short exposure period for avoiding the color saturation of the R color component is uniformly set as the exposure period of each of the R, G, and B color components. In this case, for each of the G and B color components, only part of the dynamic range of the image capturing element is used. This causes the G and B color components to have narrower gradation width (dynamic range), lower sensitivity, and higher noise than the R color component.

This may be addressed by a method of using different exposure periods for the R, G, and B color components. In detail, a short exposure period is set for the R color component to avoid the color saturation of the R color component, and a long exposure period is set for each of the G and B color components to achieve higher sensitivity, lower noise, and wider dynamic range.

FIG. 2 illustrates photographing conditions in which the exposure periods of the R, G, and B color components are made different.

If the subject is stationary and there is no camera shake, output video of high sensitivity, low noise, and wide dynamic range can be obtained by such photographing conditions.

In the case where the subject is moving (or there is camera shake), however, an afterimage of a different width occurs in the output video depending on the exposure period that differs among the R, G, and B color components (see FIG. 2). As a result of the width of the afterimage being different among the R, G, and B color components, an afterimage (colored afterimage) with a different color from the original subject color occurs.

Processing According To First Embodiment

Processing according to the first embodiment for improving the colored afterimage problem mentioned above will be described below.

Figure 3:
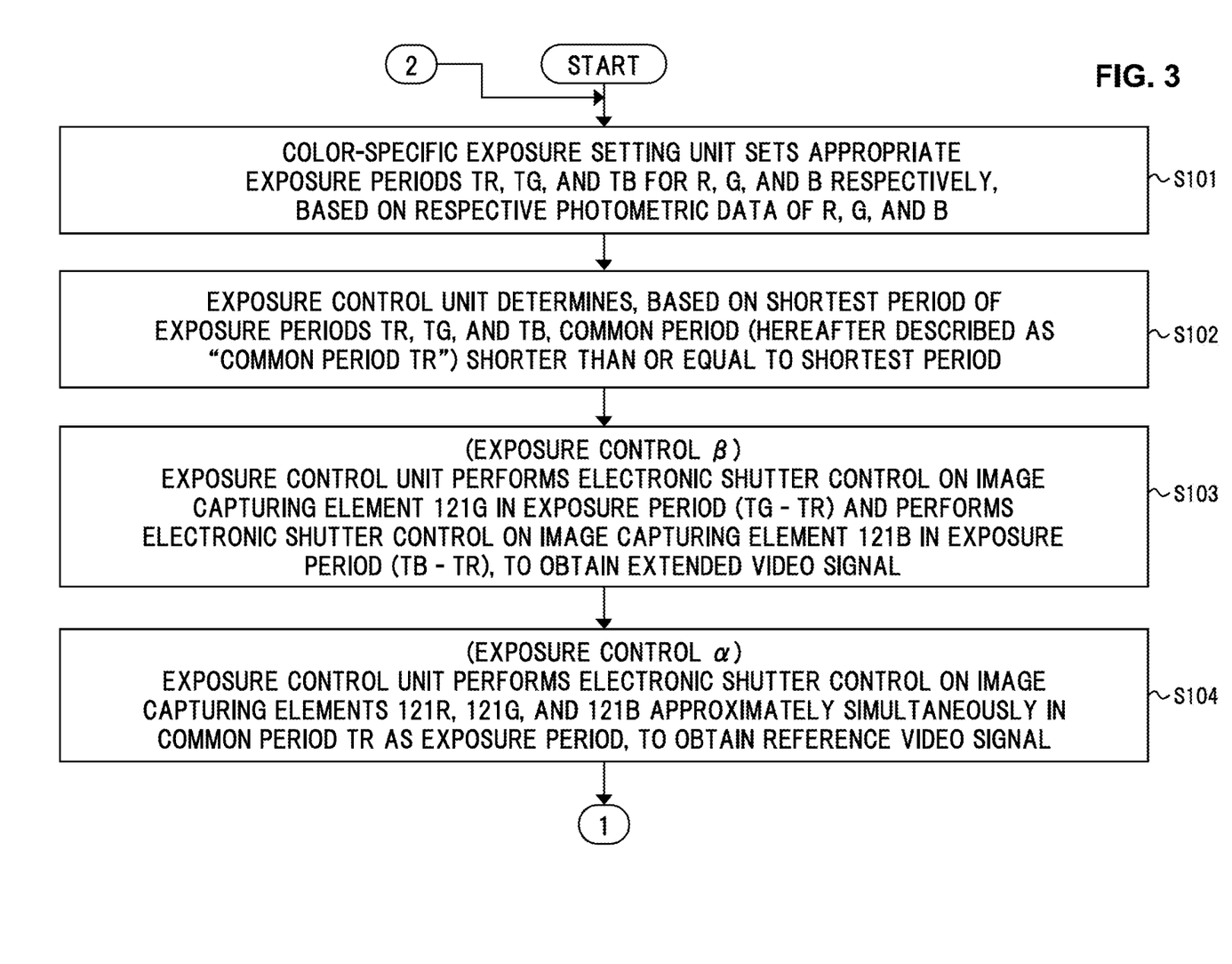
FIG. 3 is a flowchart explaining an operation sequence (1/2) of the image capturing system 100.
Figure 4:
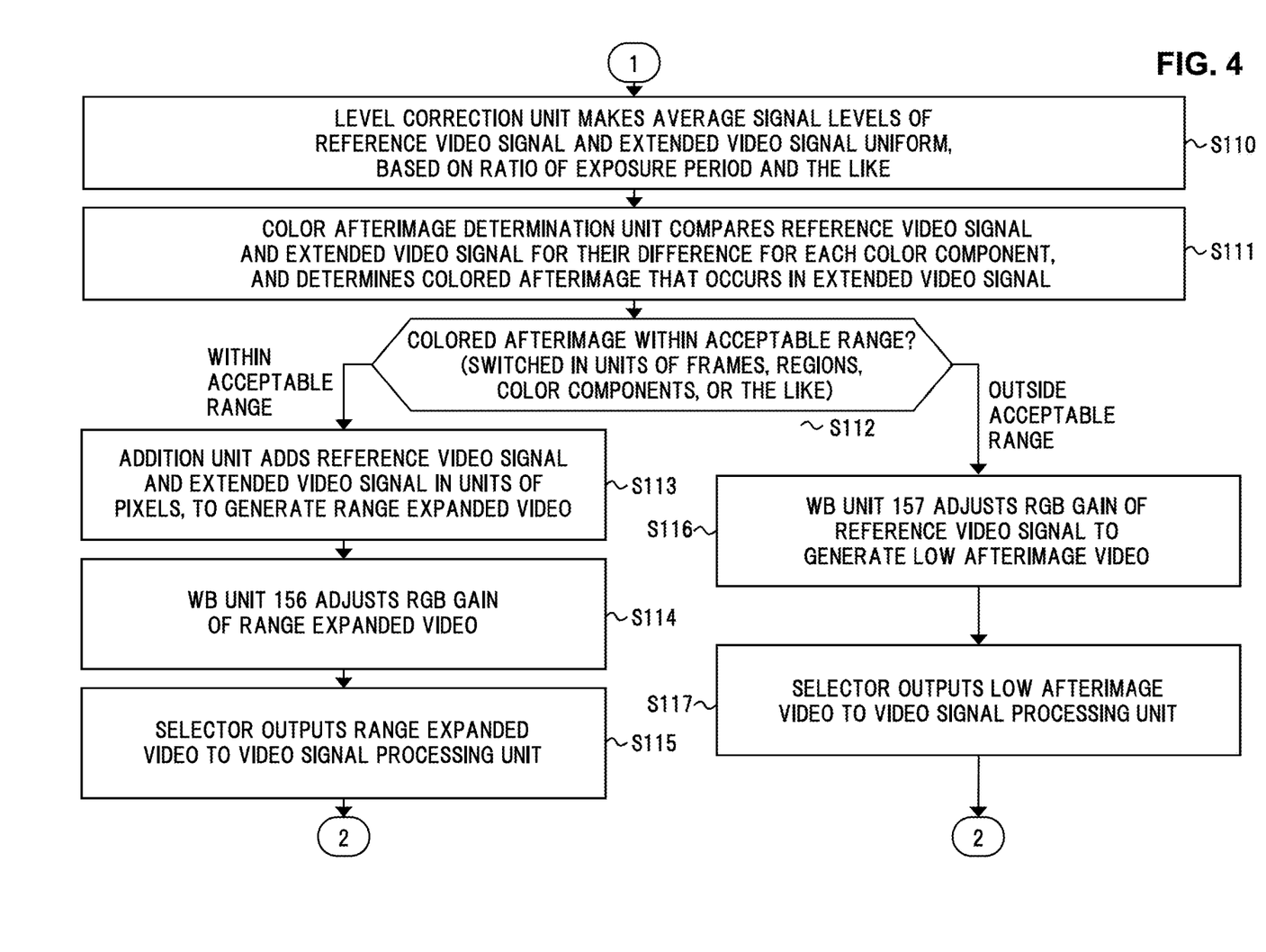
FIG. 4 is a flowchart explaining an operation sequence (2/2) of the image capturing system 100.

FIG. 3 and FIG. 4 are each a flowchart explaining an operation sequence of the image capturing system 100.

Figure 5:
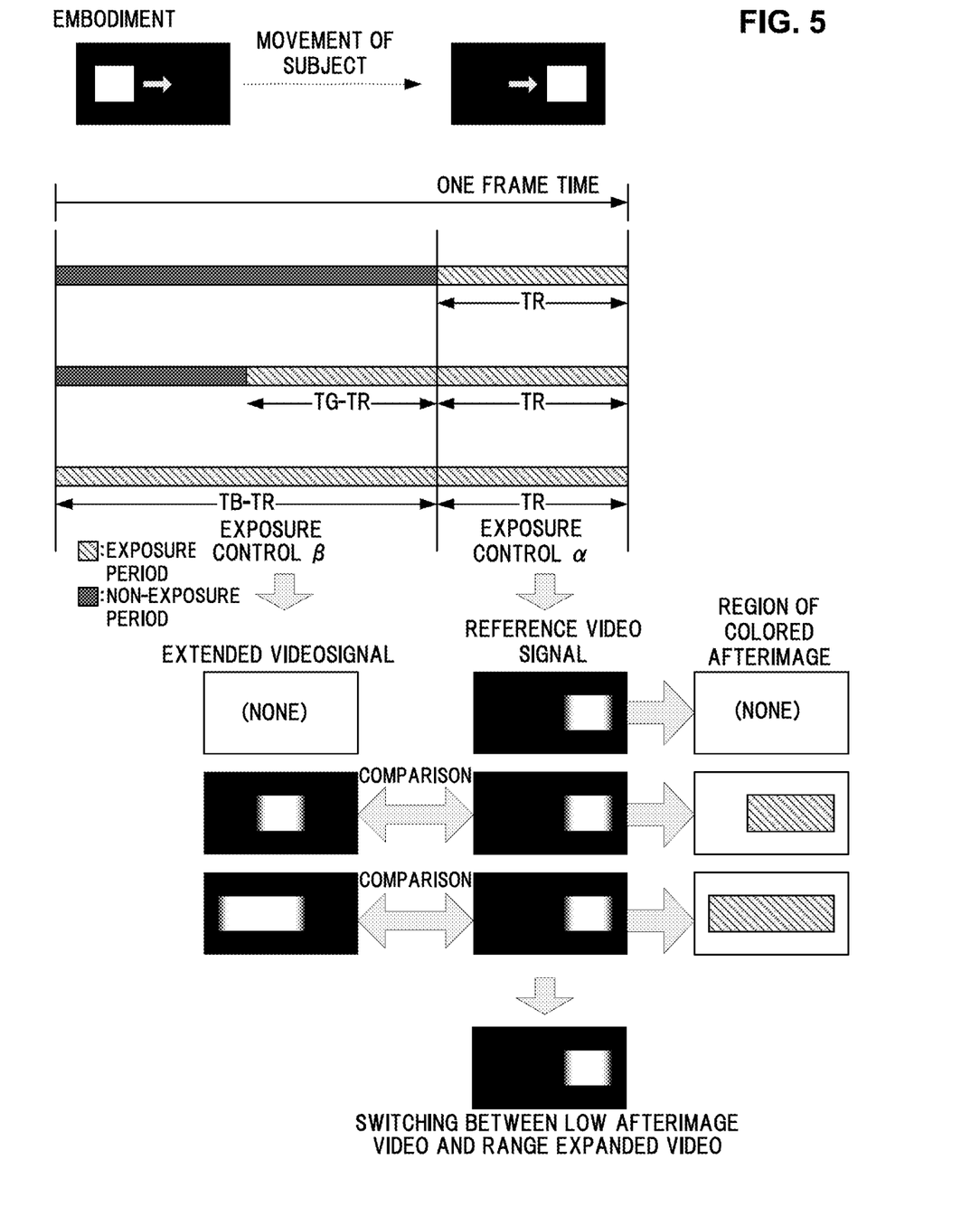
FIG. 5 is an explanatory diagram illustrating processing by the image capturing system 100.

FIG. 5 is an explanatory diagram illustrating processing by the image capturing system 100.

The steps illustrated in FIG. 3 and FIG. 4 will be described below in numerical order.

Step S101: The color-specific exposure setting unit 130 acquires photometric data of a subject for each of R, G, and B. The photometric data may be acquired from a photometric unit (not illustrated) included in the image capturing system 100. The photometric data for each of R, G, and B may be acquired by monitoring the signal output of the corresponding one of the image capturing elements 121R, 121G, and 121B.

The color-specific exposure setting unit 130 sets the exposure periods TR, TG, and TB of the image capturing elements 121R, 121G, and 121B respectively, based on the ratio of the respective photometric data of R, G, and B (see FIG. 5).

Consequently, for a color component for which the amount of light received is excessively large among the R, G, and B color components, a short exposure period is set so as not to cause color saturation in gradation. For a color component for which the amount of light received is insufficient, a long exposure period is set so as not to cause blocked-up-shadows in gradation.

Step S102: The exposure control unit 140 obtains the shortest period from the exposure periods TR, TG, and TB of the respective color components, and determines a common period shorter than or equal to the shortest period. Typically, the common period may be determined to be equal to the shortest period. In the case where, for example, the subject moves actively, however, the common period may be shorter than the shortest period in order to suppress an afterimage.

In the case illustrated in FIG. 5, the common period is determined to be equal to the exposure period TR of the R color component, for ease of explanation.

In step S103: The exposure control unit 140 performs electronic shutter control on each of the image capturing elements 121R, 121G, and 121B to obtain an extended video signal, in a remaining period as a result of subtracting the common period from the corresponding one of the exposure periods TR, TG, and TB of the color components. The exposure in the remaining period is referred to as "exposure control $\beta$".

In the case illustrated in FIG. 5, the exposure period in the exposure control $\beta$ is determined as follows:

For the R color component of the extended video signal, the exposure period is (TR-TR), that is, the exposure period is 0 (accordingly, electronic shutter control is not performed on the image capturing element 121R, and the R color component of the extended video signal is 0).

For the G color component of the extended video signal, the exposure period is determined as (TG-TR).

For the B color component of the extended video signal, the exposure period is determined as (TB-TR).

Step S104: The exposure control unit 140 approximately simultaneously performs electronic shutter control on the image capturing elements 121R, 121G, and 121B, to obtain a reference video signal, in the common period TR as the exposure period (see FIG. 5). The exposure in the common period is referred to as "exposure control $\alpha$". The electronic shutter control in steps S103 and S104 may be any of a global shutter method, a rolling shutter method, etc.

Step S110: The level correction unit 152 makes the average signal levels of the reference video signal and the extended video signal uniform, based on the "ratio of (extended video signal exposure period)/(reference video signal exposure period)" and the "photoelectric conversion curve of image capturing element". Consequently, the level difference between the two signals caused by the difference in exposure amount is cancelled out, and the level difference in units of pixels due to the colored afterimage appears clearly.

Step S111: The color afterimage determination unit 153 compares the reference video signal and the extended video signal for their difference, for each color component. In this comparison process, a pixel region in which a colored afterimage occurs is detected as a region of difference between the two signals.

Step S112: The color afterimage determination unit 153 determines whether the level difference (pixel region of colored afterimage) in units of pixels detected in step S111 is within an acceptable range in terms of image quality. In the case where the determination result is that the colored afterimage is within the acceptable range, the color afterimage determination unit 153 switches the operation to step S113 to select the range expansion mode. In the case where the determination result is that the colored afterimage is outside the acceptable range, the color afterimage determination unit 153 switches the operation to step S116 to select the low afterimage mode.

Here, the operation switching may be performed in units of frames of video, to generate an output image (moving image or continuous image) combining frames of different modes in subsequent processing. In detail, the range expansion mode is selected for a frame with less colored afterimage, and the low afterimage mode is selected for a frame with more colored afterimage.

The operation switching may be performed independently for each region in a frame (e.g. in units of pixels, in units of pixel blocks, or in units of lines), to generate an output image combining regions of different modes in subsequent processing. In detail, the range expansion mode is selected for a region with less colored afterimage, and the low afterimage mode is selected for a region with more colored afterimage.

The operation switching may be performed independently for each color component, to generate an output image combining color components of different modes in subsequent processing. In detail, the range expansion mode is selected for a color component with less colored afterimage, and the low afterimage mode is selected for a color component with more colored afterimage.

As the determination algorithm, for example, any one of the following [1] to [4] or any combination thereof may be selected.

[1] In the case where the level difference in units of pixels is greater than a predetermined threshold, the color afterimage determination unit 153 determines that the colored afterimage is outside the acceptable range, because the color difference of the color shift afterimage is clear and noticeable.

[2] In the case where the region area (the number of pixels) in which the level difference occurs is greater than a predetermined threshold, the color afterimage determination unit 153 determines that the colored afterimage is outside the acceptable range, because the color shift afterimage has a large area and is noticeable.

[3] In the case where the frequency of pixels in which the level difference occurs is greater than a predetermined threshold, the color afterimage determination unit 153 determines that the colored afterimage is outside the acceptable range, because the color shift afterimage occurs in many parts and is noticeable.

[4] In the case where the cumulative of the absolute value of the level value is greater than a predetermined threshold, the color afterimage determination unit 153 determines that the colored afterimage is outside the acceptable range, because the color shift afterimage is quantitatively large and noticeable.

Step S113: The addition unit 155 synthesizes the reference video signal and the extended video signal in units of pixels, to generate range expanded video. Typically, the reference video signal and the extended video signal may be subjected to simple addition. The range expanded video in this case is approximately equivalent to video captured in the corresponding one of the exposure periods TR, TG, and TB set in step S101. Thus, the range expanded video is video of wide dynamic range where each of the dynamic ranges of the R, G, and B color components adequately falls within the output gradation range of the corresponding one of the image capturing elements 121R, 121G, and 121B.

The reference video signal and the extended video signal may be subjected to weighted addition. For example, when the level difference between the reference video signal and the extended video signal detected by the color afterimage determination unit 153 is greater, the addition ratio of the reference video signal may be set higher to generate an eclectic output image of the range expansion mode and the low afterimage mode.

Step S114: The WB unit 156 adjusts the RGB gain of the range expanded video so that the RGB level of the range expanded video will fall within a predetermined range. In this case, it is preferable to adjust the RGB gain so as to prevent bit loss (gradation loss) according to the high dynamic range (HDR) signal format.

Step S115: The selector 158 switches to and outputs the range expanded video to the video signal processing unit 180 as an output image. Having completed the operation up to this point, the image capturing system 100 returns the operation to step S101 in order to perform photographing of a succeeding frame.

Step S116: The WB unit 157 adjusts the RGB gain of the reference video signal so that the RGB level (white balance) of the reference video signal will fall within a predetermined range. Simultaneously, the WB unit 157 adjusts (i.e. performs a kind of intensifying treatment on) the signal level of the reference video signal, and outputs it as "low afterimage video" whose average signal level has been made uniform with that of the range expanded video.

Step S117: The selector 158 switches to and outputs the low afterimage video to the video signal processing unit 180 as an output image. As a result of adjusting the average signal level in step S116, a non-continuous signal level change due to switching between the range expanded video and the low afterimage video is suppressed. Having completed the operation up to this point, the image capturing system 100 returns the operation to step S101 in order to perform photographing of a succeeding frame.

By repeatedly performing the foregoing series of operation continuously, the image capturing system 100 carries out operation sequences such as moving image photographing and still image photographing.

Effects According To First Embodiment

The effects according to the first embodiment will be described below.

(1) In the first embodiment, the exposure control $\alpha$ and the exposure control $\beta$ are performed as a type of split exposure.

In the exposure control $\alpha$, the plurality of image capturing elements are each exposure-controlled uniformly in the common period shorter than or equal to the shortest period of the exposure periods set for the respective color components. Consequently, a reference video signal without a colored afterimage can be obtained while reducing color saturation.

In the exposure control $\beta$, the plurality of image capturing elements are each exposure-controlled in the period obtained by subtracting the common period from the exposure period of the corresponding color component. Consequently, an extended video signal mainly containing a colored afterimage can be obtained.

The two signals obtained as a result of such split exposure are signals different in how the colored afterimage appears. This enables image processing such as extracting the colored afterimage based on the difference between the two signals and reducing the extracted colored afterimage.

(2) In the first embodiment, the reference video signal and the extended video signal are compared. Since the two signals are different in how the colored afterimage appears, the colored afterimage can be determined by comparing the two signals.

(3) In the first embodiment, in the case where the colored afterimage is outside the acceptable range, the low afterimage mode is performed. In the low afterimage mode, an output image (low afterimage video) is generated from the reference video signal having no colored afterimage. Therefore, in a difficult photographing environment in which the colored afterimage is outside the acceptable range, an output image having no colored afterimage can be obtained.

(4) In the first embodiment, in the case where the colored afterimage is within the acceptable range, the range expansion mode is performed. In the range expansion mode, an output image (range expanded video) is generated from the result of synthesis of the reference video signal and the extended video signal. The range expanded video has wide dynamic range, as a result of the gradation range of the extended video signal being added to the gradation range of the reference video signal. The range expanded video also has high sensitivity and high S/N, as a result of the signal level of the extended video signal being added to the signal level of the reference video signal. Therefore, in a photographing environment in which the colored afterimage is within the acceptable range, an output image of wide dynamic range, high sensitivity, and high S/N can be obtained.

(5) The low afterimage video obtained simply by intensifying the reference video signal is inferior in S/N to the range expanded video. However, a fast moving subject scene in which a colored afterimage outside the acceptable range occurs is not clearly detectable by the human eye, so that the feeling of noise is not noticeable. Moreover, a fast moving subject scene is of little use as a still image, and accordingly there is no problem in terms of still image use.

(6) In the first embodiment, switching between the low afterimage mode and the range expansion mode is performed in units of frames. Hence, in moving image photographing or continuous photographing, in a frame period in which a colored afterimage occurs due to a moving body subject, the low afterimage mode for reducing the colored afterimage is selected. In a frame period in which no colored afterimage occurs due to a stationary subject, the range expansion mode for expanding the dynamic range is selected.

Thus, by switching between the low afterimage mode and the range expansion mode in units of frames, video of wide dynamic range can be obtained in units of frames while avoiding a video failure by a colored afterimage in units of frames.

(7) In the first embodiment, switching between the low afterimage mode and the range expansion mode is performed in units of regions in a frame. Hence, for example in a contour region of a moving body subject in which a colored afterimage occurs, the low afterimage mode for reducing the colored afterimage is selected. In a region in which no colored afterimage occurs, the range expansion mode for expanding the dynamic range is selected.

Thus, by switching between the low afterimage mode and the range expansion mode in units of regions in a frame, video of wide dynamic range can be obtained in units of regions in a frame while avoiding a video failure by a colored afterimage in units of regions in a frame.

(8) In the first embodiment, the reference video signal and the extended video signal are compared for each color component, and the colored afterimage is determined for each color component. Accordingly, the colored afterimage state, such as the colored afterimage occurring in a specific color component and not occurring in the other color components, can be determined.

(9) In the first embodiment, switching between the low afterimage mode and the range expansion mode is performed for each color component based on the colored afterimage of the color component. Hence, it is possible to select, for a specific color component in which a colored afterimage occurs, the low afterimage mode to avoid a video failure caused by the colored afterimage, and select, for a color component in which no colored afterimage occurs, the range expansion mode to widen the dynamic range of the color component.

(10) In the first embodiment, color component gain correction is performed according to the low afterimage mode and the range expansion mode. This makes it possible to suppress a level change of an output image caused by mode switching between the low afterimage mode and the range expansion mode.

(11) In the first embodiment, in the exposure control $\beta$, the electronic shutter closing timing is synchronized (a kind of trailing-curtain synchronization), as illustrated in FIG. 5. A colored afterimage generated in the extended video signal as a result of such trailing-curtain synchronization appears to trail backward with respect to the moving direction of the subject. Thus, a colored afterimage close to human afterimage sensation can be obtained in the extended video signal.

Supplementary Notes on Embodiment

The foregoing color afterimage determination unit 153, mode switching unit 154, and the like may be configured as a computer system including a central processing unit (CPU), memory, etc. as hardware. By the hardware executing an image processing program stored in a computer-readable medium, the functions of the color afterimage determination unit 153, the mode switching unit 154, and the like (see FIG. 3 and FIG. 4) are implemented. Part or whole of the hardware may be replaced with a dedicated device, a general-purpose machine learning machine, a digital signal processor (DSP), a field-programmable gate array (FPGA), a graphics processing unit (GPU), a programmable logic device (PLD), or the like.

During photographing, the reference video signal and the extended video signal obtained by split exposure may be temporarily stored (e.g. stored as raw data). In such a case, by a computer system (image processing program) that corresponds to the color afterimage determination unit 153 and the mode switching unit 154 performing "colored afterimage determination" and "mode switching" subsequently, an eventual output image can be obtained.

Furthermore, by concentrating or distributing part or whole of the hardware and the program to servers on a network to form a cloud system, the functions (image processing method) corresponding to the color afterimage determination unit 153 and the mode switching unit 154 may be provided to a plurality of client terminals (users) as a service.

In the foregoing first embodiment, the exposure control $\beta$ and the exposure control $\alpha$ are performed in this order, as illustrated in FIG. 3 to FIG. 5. However, the present invention is not limited to such. The exposure control $\alpha$ and the exposure control $\beta$ may be performed in this order. In this case, since the exposure control $\alpha$ is performed first, a reference video signal with less shutter time lag can be obtained.

In the foregoing first embodiment, the reference video signal is intensified to generate low afterimage video. Since such low afterimage video has noise level increased by intensification, the contour enhancement process may be weakened or the noise reduction process may be strengthened in the video signal processing unit 180.

The foregoing first embodiment describes an RGB three-plate image capturing device. However, the number of image capturing elements in the present invention is not limited as long as there are a plurality of image capturing elements. For example, the present invention may be applied to an RGGB four-plate image capturing device.

The present invention is not limited to the foregoing embodiment, and includes various modifications. For example, the foregoing embodiment has been described in detail to help understanding the present invention, and the present invention is not necessarily limited to including all structures described above. Another structure may be added to part of the structures in the embodiment, part of the structures in the embodiment may be deleted, and/or part of the structures in the embodiment may be replaced with another structure.

DESCRIPTION OF REFERENCE NUMERALS

100 image capturing system
110 photographing optical system
120 color separation optical system
121B B color component image capturing element
121G G color component image capturing element
121R R color component image capturing element
130 color-specific exposure setting unit
140 exposure control unit
150B B color component afterimage correction unit
150G G color component afterimage correction unit
150R R color component afterimage correction unit
151 memory
152 level correction unit
153 color afterimage determination unit
154 mode switching unit
155 addition unit
156 WB unit
157 WB unit
158 selector
180 video signal processing unit
190 video signal output unit

The invention claimed is:

1. An image capturing system comprising:
a color separation optical system that disperses subject light into a plurality of wavelength ranges, and forms images of a plurality of color components;
a plurality of image capturing elements that capture the respective images of the plurality of color components, and generate the respective color components of a video signal;
a color-specific exposure setting unit that sets respective exposure periods for the plurality of color components; and
an exposure control unit that performs exposure control a of approximately simultaneously exposure-controlling each of the plurality of image capturing elements to obtain a video signal, hereafter referred to as a reference video signal, in a common period shorter than or equal to a shortest period of the respective exposure periods set for the color components, and exposure control β of exposure-controlling each of the plurality of image capturing elements to obtain a video signal, hereafter referred to as an extended video signal, in a period obtained by subtracting the common period from an exposure period of a corresponding color component.

2. The image capturing system according to claim 1, comprising
a color afterimage determination unit that compares the reference video signal and the extended video signal and determines a colored afterimage.

3. The image capturing system according to claim 2, comprising
a mode switching unit that performs a low afterimage mode of generating an output image from the reference video signal in the case where the colored afterimage determined by the color afterimage determination unit is outside an acceptable range, and performs a range expansion mode of generating an output image from a result of synthesis of the reference video signal and the extended video signal in the case where the colored afterimage is within the acceptable range.

4. The image capturing system according to claim 3, wherein the mode switching unit switches between the low afterimage mode and the range expansion mode in units of frames.

5. The image capturing system according to claim 3, wherein the mode switching unit switches between the low afterimage mode and the range expansion mode in units of regions in a frame.

6. The image capturing system according to of claim 3, wherein the color afterimage determination unit compares the reference video signal and the extended video signal for each of the color components, and determines the colored afterimage for each of the color components, and
wherein the mode switching unit switches between the low afterimage mode and the range expansion mode for each of the color components, based on the colored afterimage for each of the color components.

7. The image capturing system according to claim 3, wherein the mode switching unit performs gain correction for each of the color components according to the low afterimage mode and the range expansion mode, to suppress a level change of the output image caused by mode switching.

8. An image processing method of acquiring the reference video signal and the extended video signal from the image capturing system according to claim 1 and processing the reference video signal and the extended video signal, the image processing method comprising:
a color afterimage determination step of comparing the reference video signal and the extended video signal and determining a colored afterimage; and
a mode switching step of performing a low afterimage mode of generating an output image from the reference video signal in the case where the colored afterimage determined in the color afterimage determination step is outside an acceptable range, and performing a range expansion mode of generating an output image from a result of synthesis of the reference video signal and the extended video signal in the case where the colored afterimage is within the acceptable range.

* * * * *